United States Patent [19]

Carpenter et al.

[11] Patent Number: 5,221,578
[45] Date of Patent: Jun. 22, 1993

[54] WEAK FRANGIBLE FIBER COATING WITH UNFILLED PORES FOR TOUGHENING CERAMIC FIBER-MATRIX COMPOSITES

[75] Inventors: Harry W. Carpenter, Northridge; James W. Bohlen, Fountain Valley; Wayne S. Steffier, Huntington Beach, all of Calif.

[73] Assignee: Northrop Corporation

[21] Appl. No.: 669,138

[22] Filed: Mar. 13, 1991

[51] Int. Cl.⁵ .............................................. B32B 18/00
[52] U.S. Cl. ..................................... 428/367; 428/368; 428/375; 428/378; 428/380; 428/384; 428/689; 428/698; 428/699; 428/701; 428/702; 428/704; 501/95
[58] Field of Search ............. 501/95; 427/419.2, 443.2; 428/366, 367, 368, 375, 378, 380, 689, 698, 699, 704, 384, 312.2, 312.6, 312.8, 701, 702

[56] References Cited

U.S. PATENT DOCUMENTS

| | | | |
|---|---|---|---|
| 4,397,901 | 8/1983 | Warren | 428/101 |
| 4,543,345 | 9/1985 | Wei | 428/698 |
| 4,605,588 | 8/1986 | Simpson et al. | 428/228 |
| 4,642,271 | 2/1987 | Rice | 428/698 |
| 4,772,524 | 9/1988 | Coblenz | 428/699 |
| 4,806,428 | 2/1989 | Cooper et al. | 428/367 |
| 4,855,262 | 8/1989 | Richon et al. | 501/95 |
| 4,869,943 | 9/1989 | Corbin et al. | 428/114 |
| 4,885,199 | 12/1989 | Corbin et al. | 428/113 |
| 4,916,092 | 4/1990 | Tiegs et al. | 501/89 |
| 4,935,296 | 6/1990 | Stevens | 428/288 |
| 4,935,387 | 6/1990 | Beall et al. | 501/95 |
| 4,948,758 | 8/1990 | Beall et al. | 501/3 |
| 5,039,550 | 8/1991 | Malghan et al. | 427/419.2 |

OTHER PUBLICATIONS

L. C. Klein et al., Ceramics Bulletin, vol. 69, pp. 1821–1825 (1990).
L. C. Klein, Sol–Gel Technology for Thin Films, Noyes Publications, Park Ridge, N.J., pp. 392–397 and 260–266.
C. J. Brinker et al., J. Non–Crystalline Solids, vol. 63, p. 45 (1984).
C. J. Brinker et al., J. Non–Crystalline Solids, vol. 70, p. 301 (1985).
R. J. Iler, Chemistry of Silica, Wiley, N.Y. (1979).

Primary Examiner—Ellis P. Robinson
Assistant Examiner—Timothy M. Speer
Attorney, Agent, or Firm—Terry J. Anderson; Robert B. Block; Karl J. Hoch, Jr.

[57] ABSTRACT

A ceramic fiber/ceramic matrix composite has ceramic fibers and a porous coating on the fibers. A ceramic matrix contacts the porous coating, the fiber and coating being immersed in the ceramic matrix. The porous coating is selected from the group including $Si_3N_4$, SiC, $ZrO_2$, $Al_2O_3$, $SnO_2$ and $Ta_2O_5$. The pores are generally empty so as to render the coating frangible to promote fiber de-bonding and pull-out in the wake of an advancing crack in the matrix. In order to keep the pores empty, a non-porous sealing layer is formed over the porous coating which closes the pores without filling them. The ceramic matrix remains generally outside of the pores, whereby said pores remain empty after the fiber and coating are immersed in the ceramic matrix.

16 Claims, 1 Drawing Sheet

WEAK FRANGIBLE FIBER COATING WITH UNFILLED PORES FOR TOUGHENING CERAMIC FIBER-MATRIX COMPOSITES

BACKGROUND OF THE INVENTION

1. Technical Field

The invention is related to methods for forming ceramic matrix composites having ceramic fibers coated with a toughening layer which facilitates fiber de-bonding and pull-out in the wake of a crack in the matrix.

2. Background Art

Fiber reinforced ceramic matrix composites comprise a weave of ceramic fibers embedded in a ceramic matrix. One way of improving the mechanical properties of such a composition is to provide a coating over the fibers which is stable and resistant to oxidation and which promotes fiber de-bonding at the tip of an advancing crack and fiber bridging and eventually pull-out in the wake of an advancing crack in the composite. This feature enhances the toughness, strength and strain to failure of the composite because the fibers remain mostly immune to advancing cracks in the matrix. The history of development of this technique is described in U.S. Pat. No. 4,885,199 to Corbin et al.

For certain applications, the ceramic matrix composite must be stable at temperatures above 2200 degrees F. in an oxidizing environment. Well-known fiber coatings such as carbon and boron nitride are not stable under such conditions. Any material to be substituted for a fiber coating in place of the carbon or boron nitride must be both resistant to oxidation and must possess sufficient strength to transfer loads from the matrix to the fiber while having a low shear strength to promote debonding between the fiber and the matrix in the presence of an advancing crack. Furthermore, the coating must be easy to apply to macrofibers, fiber tows and to a weave of ceramic fibers during manufacturing.

U.S. Pat. No. 4,397,901 to Warren discloses a ceramic coating on a ceramic fiber to accommodate a thermal expansion mismatch. U.S. Pat. No. 4,935,387 and U.S. Pat. No. 4,948,758, both to Beall et al., disclose a sheet silicate coating on fibers which promotes fiber pull-out by cleavage failures between crystal sheets. The disclosures of Beall et al. rely upon the intrinsic nature of the crystalline cleavage or bond between the silicate sheets to promote fiber pull-out. U.S. Pat. No. 4,869,943 and U.S. Pat. No. 4,885,199, both to Corbin et al., disclose toughening a ceramic matrix with a fiber coating such as a pyrolytic carbon or other material which differs either in morphology or chemistry from the fiber and the matrix, thereby providing a crack deflection zone. U.S. Pat. No. 4,772,524 to Coblenz discloses a fibrous monolith, not a fiber/matrix composite, in which planes of weakness between adjacent fibers deflect advancing cracks in the monolith. U.S. Pat. No. 4,642,271 to Rice and U.S. Pat. No. 4,605,588 to Simpson et al. both disclose a BN coating on ceramic fibers. Rice discloses that the coated fibers are in a matrix and the fiber coating promotes fiber pull-out. U.S. Pat. No. 4,916,092 to Tiegs et al. discloses SiC whiskers with a layer of carbon in a whisker reinforced ceramic composite, in which none of the coatings are oxidation resistant. U.S. Pat. No. 4,543,345 to Wei discloses whisker reinforced composites with an alumina or mullite coating on the whiskers.

The prior art as described in U.S. Pat. No. 4,885,199 referenced above typically relied upon the characteristics of the inherently weak shear strength of the carbon and boron nitride coatings to achieve desired characteristics, such as toughening. For applications in the high temperature oxidizing environments described above, the intrinsic properties of the coating composition would have to provide all of the necessary features, including fiber de-bonding and pull-out as well as imperviousness to oxidation and high temperatures. The problem with this approach is that it is very difficult to select the best fiber coating material for a given ceramic fiber so as to optimize all of the foregoing features in the same coating material composition.

Thus, one object of the present invention is to depart from the prior art approach of finding a coating composition which provides all of the necessary features, and instead find a mechanical approach in which all, or at least some, of the desired features (such as fiber de-bonding and pull-out in the wake of an advancing crack in the matrix) are realized through the mechanical features of the coating and coating/fiber interface, as distinguished from the inherent features of the composition. Such a mechanical approach has many advantages and, in most cases, allows greater choice in selecting the materials for use in the coating. For example, the materials can be chosen to meet only the requirement of resistance to oxidation and stability at high temperatures, while the remaining requirements (e.g., fiber de-bonding and pull-out) are met by mechanical features in the coating or coating/fiber interface. In fact, the same composition as the fiber and/or matrix would be a candidate for the fiber coating. This advantage will become clear in the description of the invention which follows the conclusion of this description of the background art.

In the present invention, the mechanical feature which promotes the requisite tendencies (e.g., fiber de-bonding and pull-out in the wake of an advancing crack in the fiber/matrix composite) is the presence of empty pores in the fiber coating. A method of forming a porous alumina coating on a ceramic fiber which is then covered with a metal coating prior to immersion in a matrix is disclosed in U.S. Pat. No. 4,935,296 to Stevens. The Stevens patent is directed to metal-coated ceramic fibers in a matrix and in particular to solving the problem of interlocking the metal coating with an interlayer. The Stevens patent solves this problem by leaving the pores in the fiber coating open and permitting the metal coating to fill the open pores of the porous coating on the fiber, so that there is greater adhesion between the metal and the porous coating. This technique of the Stevens patent therefore achieves the opposite purpose intended in the present invention, which is not to increase adhesion (as in Stevens) but instead to permit de-bonding and fiber pull-out. In the Stevens patent, the matrix is not in contact with the porous fiber coating, but instead contacts the overlying metal coating.

Accordingly, it is an object of the invention to provide a method for forming a porous coating with empty, sealed pores on a ceramic fiber in a ceramic matrix so that the empty pores remain empty after incorporation of the fiber into a ceramic matrix and permit the fiber to de-bond and pull out from the coating under stress.

It is a further object of the invention to provide a ceramic fiber/ceramic matrix composite having a porous coating covering the fibers with empty pores which render the fiber coating frangible, thus promoting fiber de-bonding and pull-out from the coating in the wake of an advancing crack in the ceramic matrix.

It is a related object of the invention to provide a ceramic fiber/ceramic matrix composite having a sealing coating covering the fibers and directly contacting the ceramic matrix.

SUMMARY OF THE INVENTION

A coating having a plurality of open micro-pores is formed around each ceramic fiber in a ceramic fiber/matrix composite structure, so that the coating is in direct contact with the fibers and the ceramic matrix. The coating consists of an inherently strong material, such as $Si_3N_4$, SiC, $Al_2O_3$, $ZrO_2$, $SnO_2$ or $Ta_2O_5$, which are in a group of inherently strong materials susceptible of being formed with a high level of porosity throughout the thickness of the coating. Preferably, the coating is deposited in such a manner as to form microscopic empty pores throughout the coating, using well known techniques, such as those disclosed in the above-referenced patent to Stevens.

In contrast with the technique disclosed in the Stevens patent, the pores of the ceramic composite of the present invention are not filled but instead remain empty even after the coated fiber is immersed in the ceramic matrix. This is achieved by forming a sealing non-porous layer over the fiber coating which closes the pores without filling them. The empty pores render the fiber coating frangible, promoting fiber pull-out and de-bonding in the wake of an advancing crack in the ceramic matrix. In one embodiment, the pores are concentrated in a center layer of the coating, rather than being uniformly distributed across the thickness. In another embodiment, the sealing layer which closes the fiber coating pores is a smooth non-porous layer of the same material from which the porous fiber coating is formed.

The advantage of the invention is that, while the material comprising the deposited fiber coating is inherently strong, the open pores dispersed throughout the volume of the coating render the coating frangible. Under stress, the frangible nature of the fiber coating promotes fiber pull-out and fiber de-bonding from the coating. As a result, in a ceramic fiber/ceramic matrix composite in which the fibers are coated with the porous fiber coating of the present invention, an advancing crack in the ceramic matrix will cause each fiber in its wake to de-bond from its coating and pull out, preventing stresses in the ceramic matrix from prematurely fracturing the fiber. Thus, the fiber can escape damage from the advancing crack and bridge the crack surfaces, thereby toughening the fiber/matrix composite.

For applications to alumina fibers, the preferred material for the fiber coating is zirconia, tin oxide or alumina.

For applications to silicon carbide or silicon nitride fibers, the preferred material for the fiber coating is silicon carbide, silicon nitride or tantalum pentoxide. The increased surface area of the porous SiC or $Si_3N_4$ coating can lead to accelerated oxidation rates. Therefore, the choice of the $Ta_2O_5$ material for the coating may be preferable in other applications because this material has a low thermal expansion coefficient, a high melting temperature and is stable in oxidizing environments.

BRIEF DESCRIPTION OF THE DRAWINGS

The invention is described below in detail with reference to the accompanying drawings, of which.

DETAILED DESCRIPTION OF THE INVENTION

Figure 1:
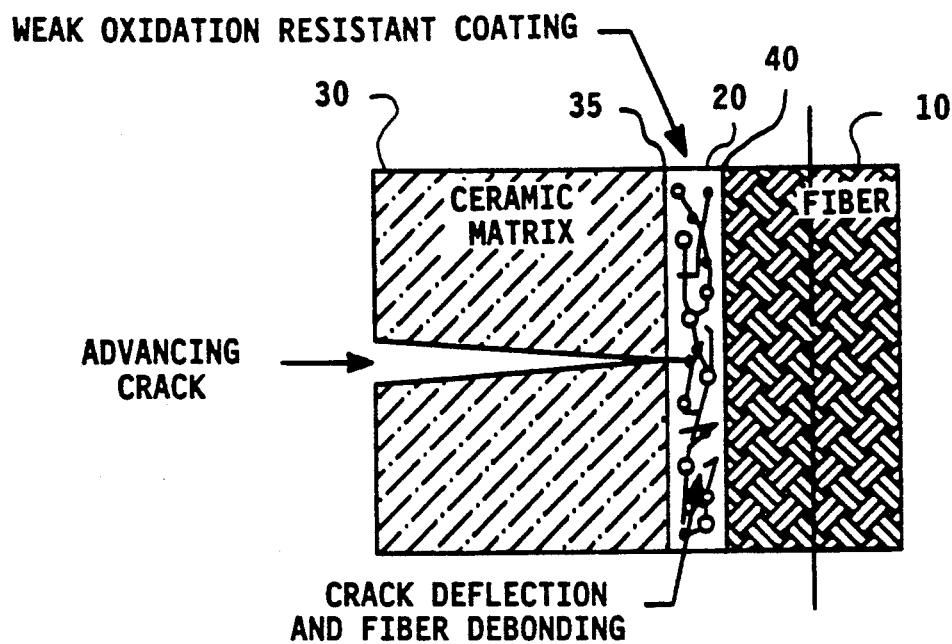
FIG. 1 is a cross-sectional view of a ceramic fiber/ceramic matrix composite formed in accordance with the present invention.

Referring to FIG. 1, a ceramic fiber 10 such as a silicon nitride fiber for example, is covered with a porous coating 20. The material of the porous coating 20 is selected from the group of inherently strong materials which can be deposited as a porous film, including $Si_3N_4$, SiC, $ZrO_2$, $SnO_2$, $Al_2O_3$ or $Ta_2O_5$. Conventional techniques for forming a porous ceramic coating may be employed in carrying out the invention. For example, a method for forming a porous layer of $Al_2O_3$, is disclosed in U.S. Pat. No. 4,935,296 to Stevens. The ceramic fiber 10 may be one of many fibers in a fiber weave. The ceramic fiber 10 or the fiber weave is then immersed in a ceramic matrix 30 to form a ceramic fiber/ceramic matrix composite, using conventional techniques for forming such composites.

Unlike the metal coating covering the porous fiber coating of the Stevens patent, the ceramic matrix 30 which covers the fiber coating in the present invention does not fill the pores. Thus, in the invention, the pores remain empty. This feature renders the porous fiber coating 20 frangible or weak. In one embodiment of the invention, the filling of the pores in the fiber coating 20 upon immersion of the fiber 10 and coating 20 into the ceramic matrix is prevented by first forming a sealing layer 35 over the coating 20 prior to immersion of the fiber 10 into the matrix 30. Preferably, the sealing layer 35 is a smooth non-porous layer of the same material from which the fiber coating 20 is formed. For example, if the porous fiber coating 20 is porous alumina formed in accordance with the techniques discussed in the above-referenced patent to Stevens, then the sealing layer 35 is a smooth non-porous layer of alumina formed over the porous fiber coating 20 prior to the immersion of the fiber 10 into the ceramic matrix 30. The sealing layer 35 covers the empty pores in the porous fiber coating 20, permanently closing them so that the ceramic material of the matrix 30 does not fill the pores. Because the pores in the fiber coating 20 remain empty in the fiber/matrix composite, the coating 20 remains frangible, promoting fiber de-bonding and pull-out in the wake of an advancing crack in the ceramic matrix 30.

Conventional techniques for forming dense or non-porous ceramic layers are employed in forming the non-porous sealing coating 35. As one example, sol-gel techniques may be employed to form both the porous fiber coating 20 as well as the dense sealing layer 35. Conventional sol-gel techniques for forming porous films such as the fiber coating 20 and for forming dense films such as the sealing layer 35 are disclosed in L. C. Klein, *Sol-Gel Technology for Thin Films, Preforms, Electronics and Specialty Shapes*, Noyes Publications, Park Ridge, N.J., pages 392-397 and pages 260-266; C. J. Brinker et al., *Journal of Non-Crystalline Solids*, Volume 63, page 45 (1984); C. J. Brinker et al., *Journal of Non-*

*Crystalline Solids*, Volume 70, page 301 (1985); R. J. Iler, *Chemistry of Silica*, Wiley, N.Y. (1979); and L. C. Klein et al., *Ceramics Bulletin*, Volume 69, pages 1821-1825 (1990).

The preferred materials in the coating 20 are zirconia, tin oxide or alumina if the ceramic fiber 10 is alumina. The preferred coatings for silicon carbide or silicon nitride fibers are silicon carbide, silicon nitride or tantalum pentoxide. Of the other materials which may be chosen for the coating 20, the increased surface area of porous SiC or $Si_3N_4$ coatings can lead to accelerated oxidation rates. Therefore, the choice of the $Ta_2O_5$ material for the coating may be preferable in other applications because this material has a low thermal expansion coefficient, a high melting temperature and is stable in oxidizing environments.

The advantage of the invention is illustrated in the drawing, showing how an advancing crack in the matrix 30, upon reaching the fiber coating 20, is absorbed by fracturing of the porous structure of the coating 20, thereby allowing the fiber 10 to debond from the coating 20 and the matrix 30, thus avoiding direct fracture of the fiber 10 from the advancing crack in the matrix 30. The pores have diameters much less than the coating, typically 1 to 100 nanometers in diameter, depending upon the coating deposition process.

Figure 2:
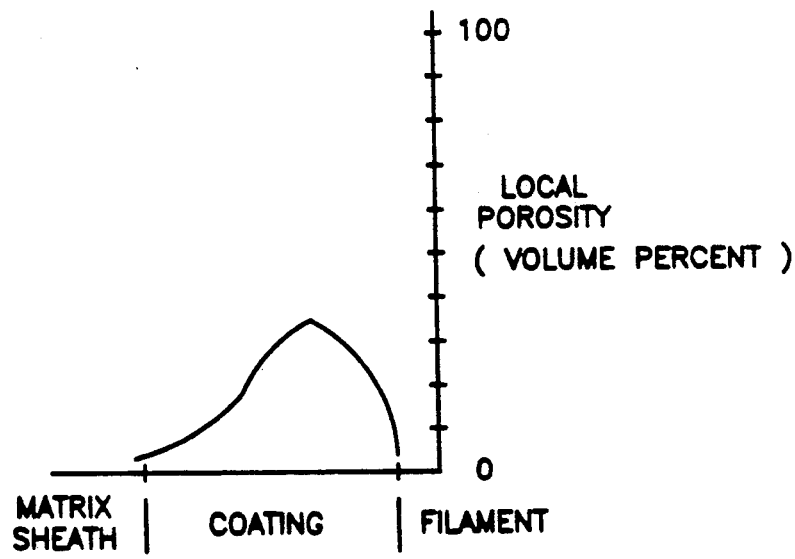
FIG. 2 is a graph of the volume concentration of micro-pores in the fiber coating of the preferred embodiment of the invention.

Ideally, the volume concentration of the pores in the coating 20 may vary with the depth. FIG. 2 is a graph of one embodiment of the invention in which the peak volume concentration of the pores, typically 25% to 60% by volume, is in a center stratum of the fiber coating 20 and tapers off near the boundaries of the coating 20. A dense coating adjacent the fiber will protect the fiber, and a dense coating adjacent the matrix will seal the pores from matrix infiltration.

In the preferred embodiment of the invention, the distribution of the pores illustrated in FIG. 2 is achieved by first depositing a bottom non-porous layer 40 directly on the fiber 10. Then, the porous fiber coating 20 is deposited over the bottom non-porous layer 40. Finally, the non-porous sealing layer 35 is deposited over the porous fiber coating 20. The transition of the pore concentration between the porous coating 20 and the non-porous layers 35 and 40 is not abrupt but rather smooth as shown in the graph of FIG. 2.

While the invention has been described in detail with reference to preferred embodiments thereof, it is understood that variations and modifications thereof may be made without departing from the true spirit and scope of the invention.

What is claimed is:

1. A ceramic fiber/ceramic matrix composite, comprising:
    a ceramic fiber;
    a frangible, porous ceramic coating deposited on said fiber having empty microscopic pores dispersed therein; and,
    a ceramic matrix contacting said porous ceramic coating, said fiber and porous ceramic coating being immersed in said ceramic matrix.

2. The composite of claim 1 wherein said porous ceramic coating is a material selected from the group consisting of $Si_3N_4$, SiC, $Al_2O_3$, $ZrO_2$, $SnO_2$ and $Ta_2O_5$.

3. The composite of claim 1 further comprising a sealing layer covering said porous ceramic coating whereby infiltration of said ceramic matrix into said pores is generally prevented.

4. The composite of claim 1 wherein a volume concentration of said pores in said porous ceramic coating is minimal at boundaries of said porous ceramic coating and is maximum in a middle portion of said porous ceramic coating.

5. The composite of claim 3 wherein said sealing layer and said porous ceramic coating comprise the same material.

6. A composite of ceramic fibers immersed in a ceramic matrix, said ceramic fibers being covered by a deposited frangible porous ceramic fiber coating in direct contact with both the ceramic fibers and the ceramic matrix, said porous ceramic fiber coating having a plurality of pores dispersed within the porous ceramic fiber coating, said pores being generally empty whereby said porous ceramic fiber coating is rendered frangible and whereby de-bonding and pull-out of said ceramic fibers from said ceramic matrix under stress is promoted.

7. The composite of claim 6 wherein said porous ceramic fiber coating is a material selected from the group consisting of $Si_3N_4$, SiC, $Al_2O_3$, $ZrO_2$, $SnO_2$ and $Ta_2O_5$.

8. The composite of claim 6 further comprising a sealing layer covering said porous ceramic fiber coating whereby said pores within said porous ceramic fiber coating are closed and infiltration of said ceramic matrix into said pores is prevented.

9. The composite of claim 6 wherein a volume concentration of said pores in said porous ceramic fiber coating is minimal at boundaries of said porous ceramic fiber coating and is maximum in a middle portion of said porous ceramic fiber coating.

10. The composite of claim 8 wherein said sealing layer and said porous ceramic fiber coating comprise the same material.

11. A method of toughening a ceramic fiber/matrix composite comprising ceramic fibers immersed in a ceramic matrix, the method comprising the steps of:
    prior to immersing the ceramic fibers in the ceramic matrix, depositing a frangible porous ceramic coating on each of said ceramic fibers, said porous ceramic coating having a plurality of pores whereby said porous ceramic coating is rendered frangible; and
    immersing the coated ceramic fibers in the ceramic matrix, whereby the ceramic matrix contacts the porous ceramic coating.

12. The method of claim 11 wherein said depositing step forms said pores and wherein said pores are generally empty, and wherein said pores remain generally empty after said immersing step.

13. The method of claim 11 further comprising forming a sealing layer over said porous ceramic coating prior to the immersing step.

14. The method of claim 13 wherein said sealing layer comprises the same material as said porous ceramic coating.

15. The method of claim 11 wherein said porous ceramic coating comprises a material selected from the group consisting of $Si_3N_4$, SiC, $Al_2O_3$, $ZrO_2$, $SnO_2$ and $Ta_2O_5$.

16. The method of claim 11 wherein a volume concentration of said pores in said porous ceramic coating is minimal at boundaries of said porous ceramic coating and is maximum in a middle portion of said porous ceramic coating.

* * * * *